(12) United States Patent
Xu et al.

(10) Patent No.: US 9,031,129 B2
(45) Date of Patent: May 12, 2015

(54) JOINT SPATIO-TEMPORAL PREDICTION FOR VIDEO CODING

(75) Inventors: Jizheng Xu, Beijing (CN); Feng Wu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1949 days.

(21) Appl. No.: 11/763,955

(22) Filed: Jun. 15, 2007

(65) Prior Publication Data
US 2008/0310506 A1    Dec. 18, 2008

(51) Int. Cl.
| H04B 1/66 | (2006.01) |
| H04N 11/02 | (2006.01) |
| H04N 19/577 | (2014.01) |
| H04N 19/63 | (2014.01) |
| H04N 19/61 | (2014.01) |
| H04N 19/593 | (2014.01) |

(52) U.S. Cl.
CPC ............ H04N 19/577 (2014.11); H04N 19/63 (2014.11); H04N 19/61 (2014.11); H04N 19/593 (2014.11)

(58) Field of Classification Search
USPC .............................. 375/240.1, 240.11, 240.12
See application file for complete search history.

(56) References Cited

U.S. PATENT DOCUMENTS

| 5,228,098 A | 7/1993 | Crinon et al. |
| 5,317,397 A | 5/1994 | Odaka et al. |
| 6,347,157 B2 | 2/2002 | Chui |
| 6,728,316 B2 | 4/2004 | Enficiaud et al. |
| 6,993,201 B1 | 1/2006 | Haskell et al. |
| 7,027,512 B2 | 4/2006 | Jeon |
| 7,106,910 B2 | 9/2006 | Acharya et al. |
| 2002/0154697 A1 | 10/2002 | Jeon |
| 2005/0053132 A1* | 3/2005 | Caball et al. ............. 375/240.11 |
| 2006/0012680 A1 | 1/2006 | Bourge |
| 2006/0013309 A1* | 1/2006 | Ha et al. ................... 375/240.16 |
| 2006/0013310 A1* | 1/2006 | Lee et al. ................. 375/240.16 |
| 2006/0029136 A1* | 2/2006 | Cieplinski et al. ........ 375/240.12 |

(Continued)

FOREIGN PATENT DOCUMENTS

| EP | 0644695 A2 | 3/1995 |
| WO | WO2006040793 A2 | 4/2006 |

OTHER PUBLICATIONS

Subband Prediction Using Leakage Information in Image Coding; Vaisey, Jacques, IEEE 1995.*

(Continued)

*Primary Examiner* — Luu Pham
*Assistant Examiner* — Jahangir Kabir
(74) *Attorney, Agent, or Firm* — Miia Sula; Judy Yee; Micky Minhas (57) ABSTRACT

Systems and methods are described for joint spatio-temporal prediction (JSTP) during video coding. A given block of pixels is simultaneously predicted via inter frame prediction and intra frame prediction. The joint spatio-temporal prediction provides a new JSTP coding mode besides inter and intra modes in coding schemata such as the H.264/AVC video coding standard. In one implementation, subband decomposition obtains a high-pass component of inter frame prediction of a block and a low-pass component of intra frame prediction of the same block. The high-pass component of the inter prediction and the low-pass component of the intra prediction are combined to produce the joint spatio-temporal prediction. In one implementation, a difference between the original block and the JSTP prediction is coded in a bitstream to represent the block.

7 Claims, 7 Drawing Sheets

(56) References Cited

U.S. PATENT DOCUMENTS

| | | |
|---|---|---|
| 2006/0114998 A1 | 6/2006 | Barrau |
| 2007/0014358 A1 | 1/2007 | Tourapis et al. |
| 2007/0031052 A1* | 2/2007 | Turaga et al. ............... 382/240 |
| 2009/0041121 A1* | 2/2009 | Chen et al. ............... 375/240.12 |

OTHER PUBLICATIONS

Coding Gain of Intra/Inter-frame Subband Systems; Calvagno et al, IEEE 1995.*

Andriani, et al., "Lossless video compression using a spatio-temporal optimal predictor", available at least as early as Apr. 18, 2007, at <<http://www.arehna.di.uoa.gr/Eusipco2005/defevent/papers/cr1324.pdf>>, pp. 1-4.

Chung, "Implementing the H.264/AVC Video Coding Standard on FPGAs", available at least as early as Apr. 18, 2007, at <<http://www.xilinx.com/publications/solguides/be_01/xc_pdf/p18-21_be1-dsp4.pdf>>, Xilinx, Inc., 2005, pp. 18-21.

* cited by examiner

JOINT SPATIO-TEMPORAL PREDICTION FOR VIDEO CODING

BACKGROUND

In video signals, strong spatial and temporal correlations exist. When video frames are partitioned into blocks, strong "intra frame" spatial correlation often exists between neighboring block in the same frame. Likewise, strong "inter frame" temporal correlation exists between corresponding blocks on temporally adjacent or neighboring frames in a video sequence.

Exploiting such correlation is the key to many techniques for achieving high data compression ratios in video coding. For example, widely used video coding standards (e.g., MPEG-1, MPEG-2, MPEG-4, H.261, H.263, H.264) utilize motion compensated prediction ("inter prediction"), which is effective for exploiting temporal correlation. In motion compensated prediction, a block to be coded searches its corresponding block in the neighboring frames and the difference signals are coded. Each new standard uses better temporal prediction technology than its predecessor to obtain better coding performance. For instance, half-pel motion compensated prediction was used in MPEG-2 to improve coding performance. H.264/AVC uses various techniques, including quarter-pel motion compensated prediction, variable block size motion compensation, and multiple reference frames, which significantly improve the prediction effectiveness and thus the coding performance. There are ongoing efforts to further improve the effectiveness of temporal prediction.

On the other hand, in H.264/AVC "intra prediction" exploits the spatial correlation among neighboring blocks in the same frame. In intra prediction, pixels neighboring the current block being coded form a predictive block along a given direction and the difference signals between the current block to be coded and the neighboring, predictive block, are coded. Intra prediction remarkably improves the coding performance when inter prediction can be not used, e.g., in an intra frame context, or when inter prediction is not effective, as when there are fast moving objects depicted in the video sequence.

Figure 1:
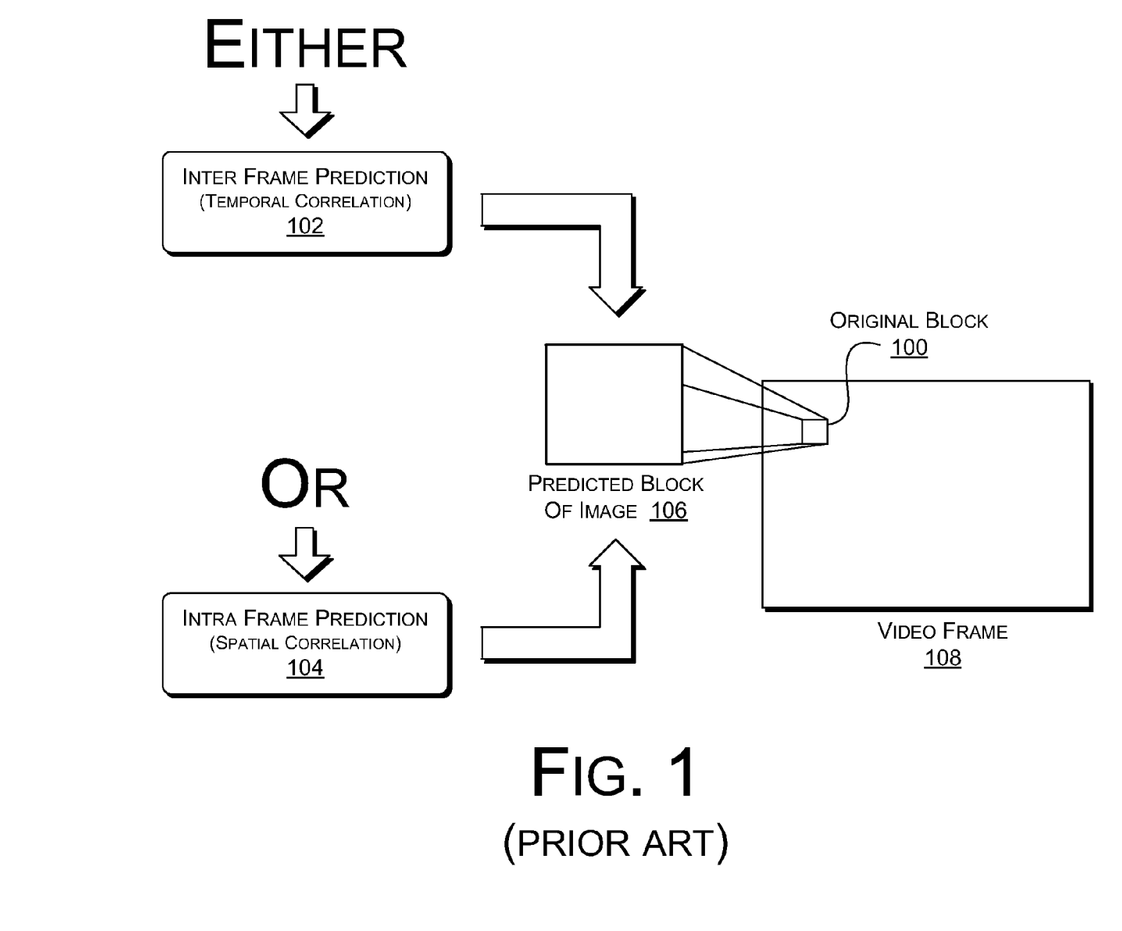
FIG. 1 is a diagram of conventional prediction during video coding.

FIG. 1 shows conventional prediction in video coding. A current image block 100 is an original block of pixels in a video frame 108 being coded. With respect to the above-introduced video coding standards, although sophisticated conventional inter prediction 102 techniques and sophisticated conventional intra prediction 104 techniques are both available and significantly improve coding performance (e.g., in H.264), each predicted block 106 that tries to emulate the current original block 100 being coded in a video frame 108 can conventionally only be predicted from one kind of conventional prediction mode: either inter frame prediction 102 or intra frame prediction 104. No predicted block 106 can simultaneously exploit both temporal and spatial correlations with other blocks.

SUMMARY

Systems and methods are described for joint spatio-temporal prediction (JSTP) during video coding. A given block of pixels is simultaneously predicted via inter frame prediction and intra frame prediction. The joint spatio-temporal prediction provides a new JSTP coding mode besides inter and intra modes in coding schemata such as the H.264/AVC video coding standard. In one implementation, subband decomposition obtains a high-pass component of inter frame prediction of a block and a low-pass component of intra frame prediction of the same block. The high-pass component of the inter prediction and the low-pass component of the intra prediction are combined to produce the joint spatio-temporal prediction. In one implementation, a difference between the original block and the JSTP prediction is coded in a bitstream to represent the block.

This summary is provided to introduce the subject matter of joint spatio-temporal prediction for video coding, which is further described below in the Detailed Description. This summary is not intended to identify essential features of the claimed subject matter, nor is it intended for use in determining the scope of the claimed subject matter.

DETAILED DESCRIPTION

Overview

Figure 2:
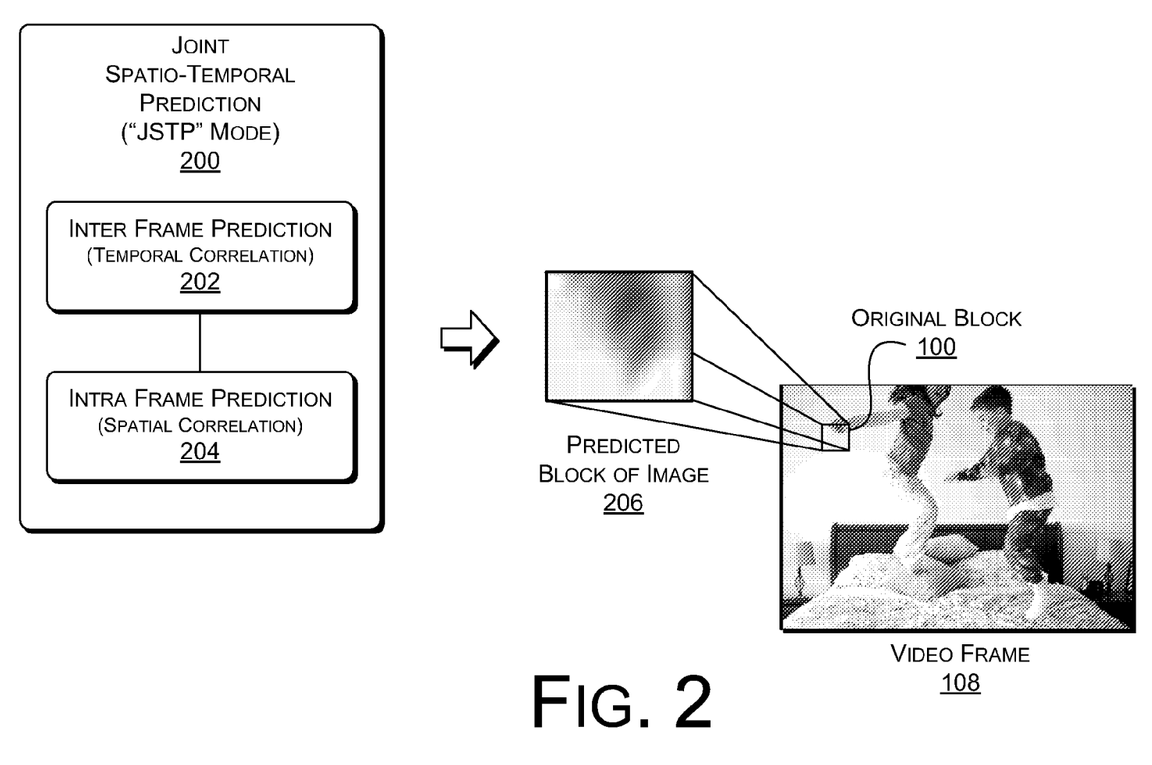
FIG. 2 is a diagram of exemplary (JSTP) joint spatio-temporal prediction of a block during video coding.

As shown in FIG. 2, this disclosure describes exemplary systems and methods for performing joint spatio-temporal prediction (JSTP) 200 for video coding. The joint spatio-temporal prediction provides a new JSTP video coding mode that simultaneously exploits both temporal (inter frame) prediction 202 and spatial (intra frame) prediction 204 for the same block of a video frame 108. Exemplary JSTP 200 combines some benefits from both types of prediction, as will be described further below.

Figure 3:
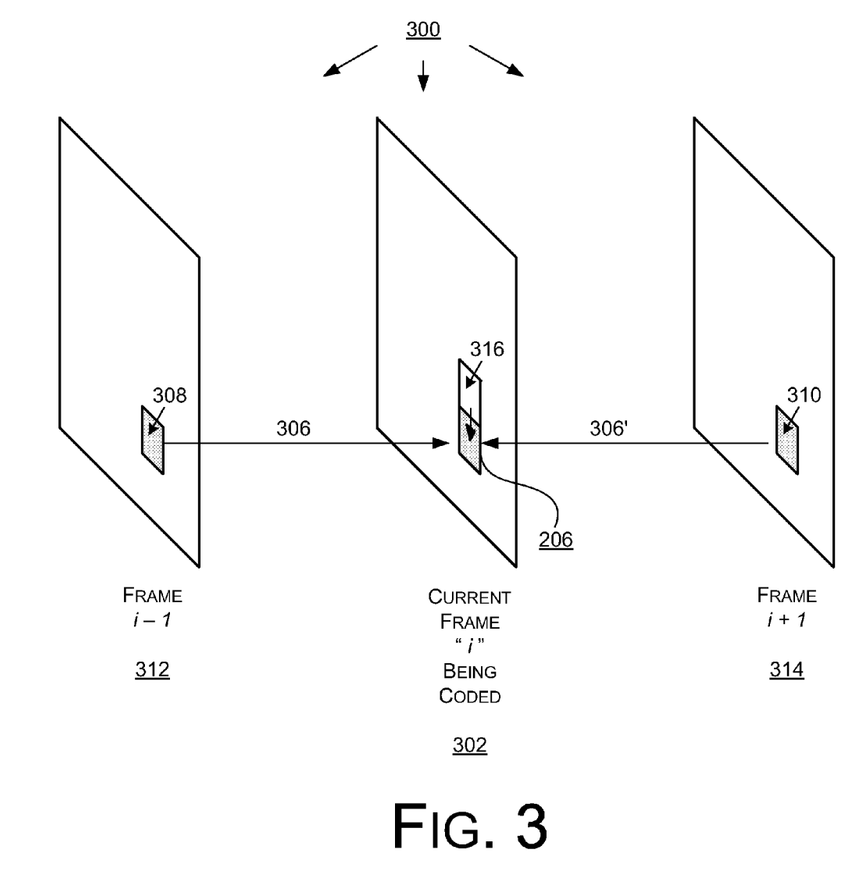
FIG. 3 is a diagram of video frames during exemplary (JSTP) joint spatio-temporal prediction of a block.

FIG. 3 shows a sequence of video frames in a video sequence 300 during exemplary joint spatio-temporal prediction of a block. Shown in the middle, a current video frame 108 being coded includes a current block 100 to be coded. Strong temporal correlation (306, 306') typically exists between the current block 100 and a corresponding block 308 (and/or 310) in a preceding video frame 312 and/or a subsequent video frame 314. Similarly, strong spatial correlation typically exists between the current block 100 and neighboring blocks (such as block 316) in the same current frame 108. Exemplary joint spatio-temporal prediction (JSTP) 200 predicts the current block 100 using both the temporal correlation(s) 306 from corresponding blocks (308, 310) in temporally different frames (e.g., 312, 314) and the spatial correlation from neighboring blocks(s) (e.g., block 316) in the same frame 108.

In one implementation, an exemplary technique combines both inter prediction 202 and intra prediction 204 by applying subband decomposition to prediction results. The predictions generated from intra prediction 204 and inter prediction 202 are also decomposed into low-pass components and high-pass components. Then the low-pass component of intra prediction 204 is used to predict the low-pass of the signals to be coded. The high-pass component of inter prediction 202 is used to predict the high-pass of the signals to be coded.

Exemplary System

Figure 4:
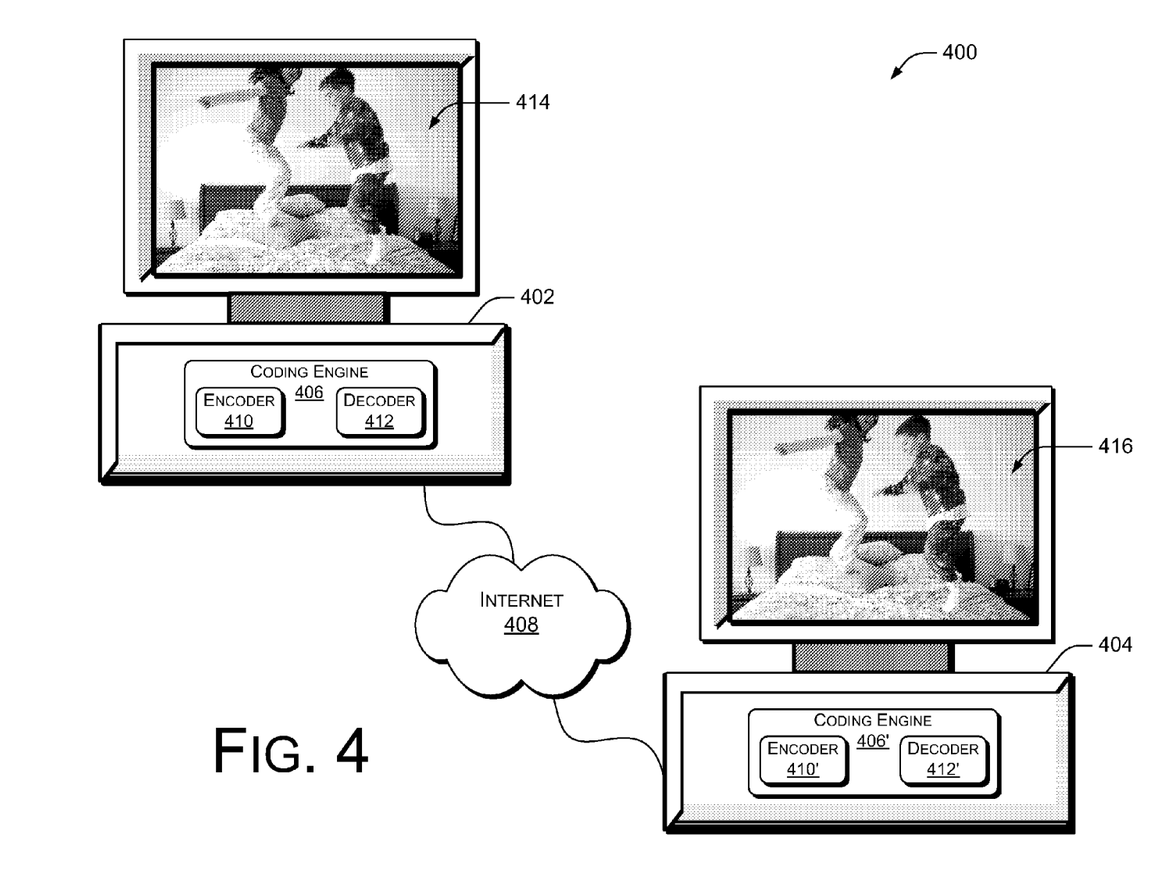
FIG. 4 is a diagram of an exemplary system implementing exemplary (JSTP) joint spatio-temporal prediction during video coding.

FIG. 4 shows an exemplary system 400 providing an environment for performing exemplary joint spatio-temporal prediction JSTP 200. The shown system 400 is just one example for the sake of description. Many other system configurations are also possible for performing the exemplary JSTP 200.

In the exemplary system 400, a first computing device 402 and a second computing device 404 each host an instance of an exemplary coding engine 406. The first and second computing devices may be a desktop, notebook, or mobile computer, or another device capable of processing video code and/or video signals. In this example, the two computing devices (402, 404) are communicatively coupled via the Internet 408.

Each instance of the coding engine 406 includes an encoder 410 and a decoder 412. The native data size of a video sequence 414 at the first computing device 402 is relatively huge and thereby unwieldy and impractical to transmit to the second computing device 404. The exemplary encoder 410 at the first computing device 402 compresses the data size of the video sequence 414 via exemplary JSTP 200 during video coding. The decoder 412' at the second computing device 404 can decompress the coded video to reconstitute the video sequence 416, at a level of fidelity that depends on the type of component video coding and decoding techniques employed. In this illustrated example, because the two coding engines (406, 406') on connected computing devices (402, 404) each have an encoder 410 and a decoder 412, users at either end of the connection may send video sequences coded via exemplary JSTP 200 to each other.

Exemplary Engine

Figure 5:
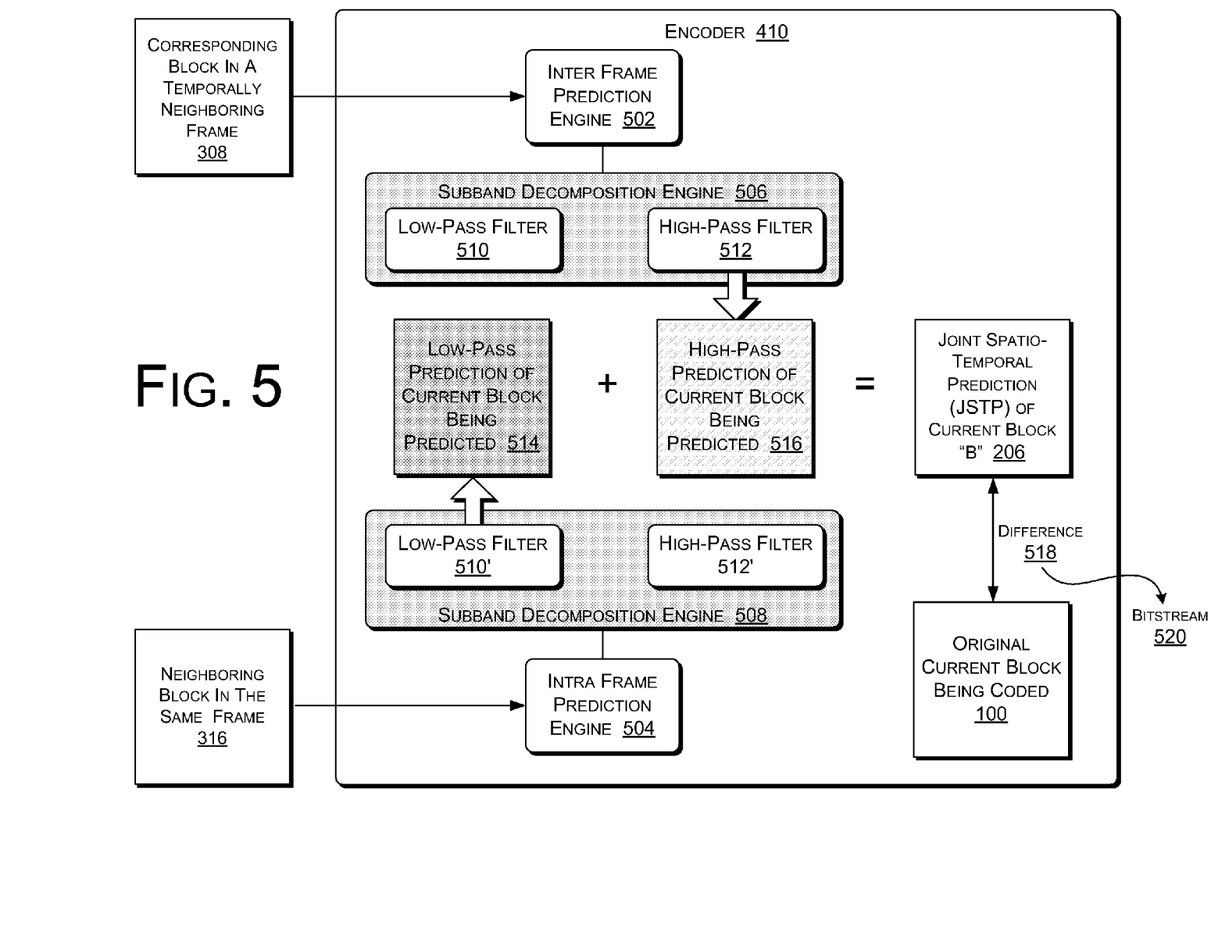
FIG. 5 is a block diagram of an exemplary encoder for video coding via exemplary (JSTP) joint spatio-temporal prediction.

FIG. 5 shows the exemplary encoder 410 (or 410') of FIG. 4, in greater detail. The illustrated implementation is only one example configuration, for descriptive purposes. Many other arrangements of the components of an exemplary encoder 410 that executes JSTP 200 are possible within the scope of the subject matter. Such an exemplary encoder 410 can be executed in hardware, software, or combinations of hardware, software, firmware, etc.

The exemplary encoder 410 includes an inter frame prediction engine 502 and an intra frame prediction engine 504. The inter frame prediction engine 502 is coupled with a subband decomposition engine 506. Likewise, the intra frame prediction engine 504 is also coupled with a subband decomposition engine 508. Each subband decomposition engine (506, 508) includes a respective low-pass filter 510 (or 510') and a high-pass filter 512 (or 512').

Operation of the Exemplary Engine

Figure 6:
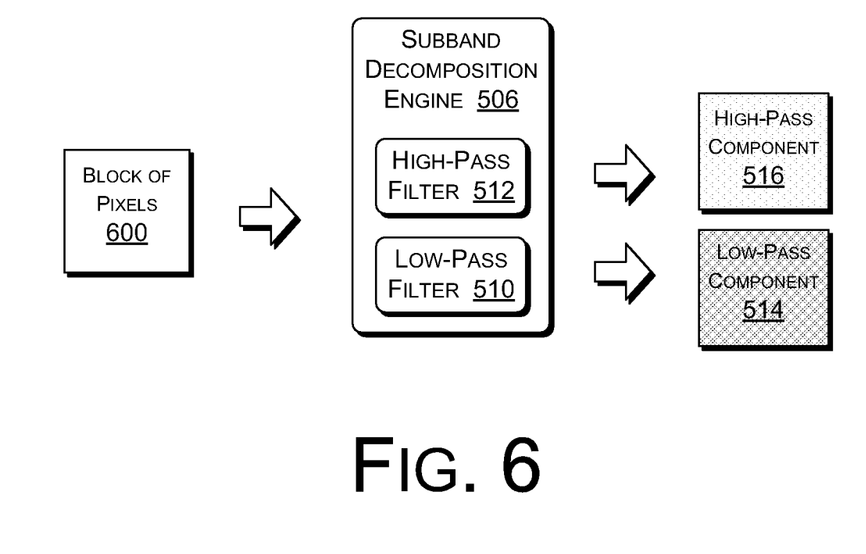
FIG. 6 is a block diagram of an exemplary subband decomposition engine.

Referring to FIG. 6, an exemplary subband decomposition engine 506 includes a low-pass filter 510 and a high-pass filter 512 that are used to generate a low-pass component 514 and a high-pass component 516 of an n-by-n block of pixels 600 in a given video frame. In one implementation, given the n-by-n block of pixels 600 (in H.264/AVC, n can be 2, 4, 8, or 16), the subband decomposition engine 506 applies a 1-dimensional low-pass filter f 510 horizontally and then vertically to the block 600 to obtain a low-pass component L(B) 514. The low-pass filter f 510 can be arbitrary. One simple example low-pass filter 510 is the 1-dimensional operator [1, 2, 1]/4. In such a case, the process is identical to applying a 2-dimensional low-pass filter 510 of the form $$\begin{bmatrix} 1 & 2 & 1 \\ 2 & 4 & 2 \\ 1 & 2 & 1 \end{bmatrix} / 16$$

on the block 600. Let $f_2$ denote the corresponding 2-dimensional low-pass filter. Then, as in Equation (1):

$$L(B)=B*f_2 \quad (1)$$

When convoluting with the low-pass filter 510, the values of the pixels outside the block 600 in the same given video frame are just copied from the nearest pixels within the block 600. Once the low-pass operator L( ) is defined, then the high-pass operator H( ) can be also be defined or calculated as in Equation (2):

$$H(B)=B-L(B) \quad (2)$$

Then, H(B) is the high-pass component 516 of the block of pixels 600. The sum of the two operators L(B) and H(B) is the current block 600 itself. Thus, the subband decomposition engine 506 decomposes a given block of pixels 600 into a low-pass component L(B) 514 and a high-pass component H(B) 516.

Referring back to FIG. 5, in JSTP 200, for each current predicted block B 206, the inter prediction engine 502 predicts $P_{inter}$, the temporal prediction of the current predicted block B 206 from corresponding block(s) 308 in a temporally neighboring frame, as was shown in FIG. 3. Likewise, for the same current predicted block B 206, the intra prediction engine 504 predicts $P_{intra}$, the spatial prediction of current predicted block B 206, from a neighboring block 316 in the same video frame 108. The intra prediction $P_{intra}$ does not tend to reflect detailed information of the original version of the block 100 because it is derived from a different, neighboring block in the same video frame 108. However, the inter prediction $P_{inter}$ tends to well-reflect the original block 100 both in global information and in details. But when motion in the video sequence 300 is fast or the change among different frames does not match the operative motion model, then $P_{inter}$ may be significantly worse than $P_{intra}$. Thus, the operators L( ) and H( ) are applied to $P_{intra}$ and $P_{inter}$ to decompose the prediction signals. The low-pass filter 510 provides $L(P_{intra})$ to predict the low-pass prediction L(B) 514 of current predicted block B 206, and the high-pass filter 512 provides $H(P_{inter})$ to predict the high-pass prediction H(B) 516 of current predicted block B 206. Then, the new JSTP prediction 200 for the current predicted block B 206 is given in Equation (3) as:

$$P_{JSTP}=L(P_{intra})+H(P_{inter}) \quad (3)$$

That is, the low-pass component 514 of current predicted block B 206 is predicted from intra prediction 204 while the detailed high-pass component 516 is predicted from inter prediction 202. Since during encoding the original block 100 is available to the encoder 410, the delta or difference 518 between the signal of this original block 100 and the JSTP prediction (i.e., Original−$P_{JSTP}$) is coded to form the bitstream 520 to be transmitted. To summarize, in JSTP 200, a predicted block 206 is constituted from a high-pass component 516 from inter prediction 202 and a low-pass component 514 from intra prediction 204. The difference 518 between this JSTP predicted block 206 and the original block 100 being coded forms part of the bitstream 520—of efficient data size—that can reconstitute the original block 100.

The new JSTP prediction 200 can be implemented as a new coding mode, besides intra coding 204 and inter coding 202, in the H.264/AVC standard. The new mode, called JSTP mode, should send both the motion vector (for inter prediction 202) and the intra prediction direction (for intra prediction 204) to the decoder 412. At the decoder 412, the inter prediction 202 and the intra prediction 204 can be generated to be the same as those at the encoder 410. By applying Equation (3), the decoder 412 can also generate the same JSTP prediction 200. Then the difference 518 stored in the bitstream 520 can be added to the JSTP prediction 200 to obtain the block. Thus, the signals can be correctly decoded.

Exemplary Method

Figure 7:
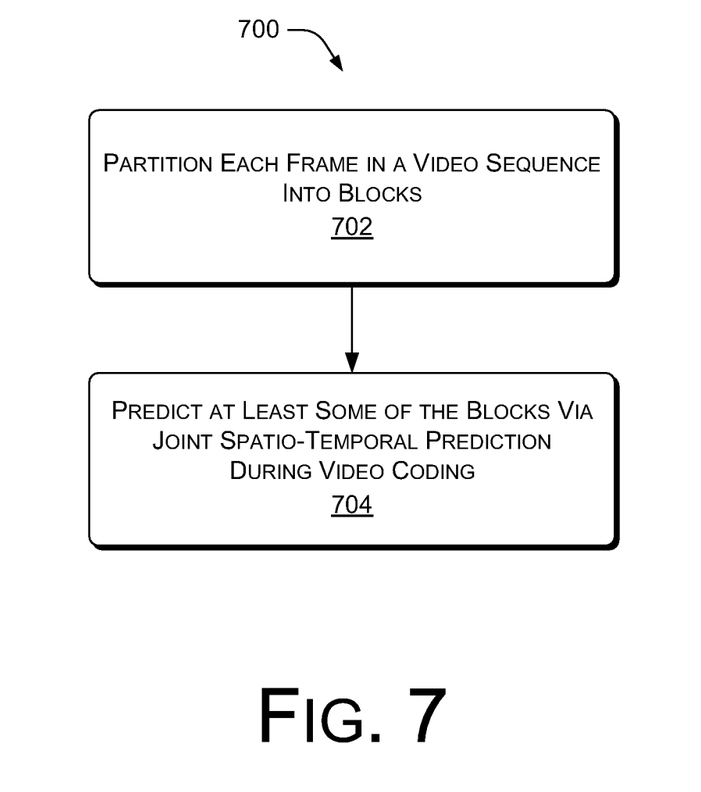
FIG. 7 is a flow diagram of an exemplary method of predicting blocks during video coding via (JSTP) joint spatio-temporal prediction.

FIG. 7 shows an exemplary method 700 of predicting blocks during video coding via (JSTP) joint spatio-temporal prediction. In the flow diagram, the operations are summarized in individual blocks. The exemplary method 700 may be performed by hardware, software, or combinations of hardware, software, firmware, etc., for example, by components of the exemplary encoder 410.

At block 702, each frame in a video sequence is partitioned into blocks. Each block is typically an n-by-n block of pixels. In the H.264/AVC standard, n can be 2, 4, 8, or 16.

At block 704, at least some of the blocks are predicted via joint spatio-temporal prediction during video coding. The joint spatio-temporal coding includes applying a low-pass filter to the intra prediction (spatial prediction) of the current block being predicted and applying a high-pass filter to the inter prediction (temporal prediction) of the same block. The high-pass filtering can be obtained by applying a low-pass filter and subtracting from the original block. Conventional techniques can be used for the inter frame and intra frame prediction that is subjected to the low-pass and high-pass filtering just described. For example, as allowed by the video coding standard being utilized by a given encoder, the intra frame prediction could employ prediction techniques that include sub sampling, coarse quantization, vector quantization, transform coding (e.g., DCT), etc. Likewise, various conventional inter frame prediction techniques can be used for the temporal prediction used in the exemplary method 700.

Then the high-pass filtered component of the inter prediction is added to the low-pass filtered component of the intra prediction to obtain the joint spatio-temporal prediction of the current block. That is, the low-pass component of the current predicted block is predicted from intra prediction while the detailed high-pass component of the current predicted block is predicted from inter prediction. The difference between the (signal of the) original block and the JSTP prediction can be coded to form the bitstream content for the block to be transmitted to a decoder, along with a motion vector to direct the inter prediction at the decoder and a direction vector to direct the intra prediction at the decoder.

Conclusion

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method implemented by a computing device, comprising:

receiving, at the computing device, a bitstream representing a video sequence, the bitstream including a motion vector, a direction vector, and a difference that is to be added to a joint spatio-temporally predicted block to obtain a block of a frame in the video sequence;

determining, by the computing device and at least partly in response to receiving the bitstream, the joint spatio-temporally predicted block by:

determining an inter frame prediction of the block based at least in part on the motion vector;

decomposing, applying a subband decomposition, the inter frame prediction into a high-pass component and a low-pass component; and determining an intra frame prediction of the block based at least in part on the direction vector;

decomposing, applying a subband decomposition, the intra frame prediction into a high-pass component and a low-pass component; and combining the low-pass component of the intra frame prediction with the high-pass component of the inter frame prediction to obtain the joint spatio-temporally predicted block; and adding, by the computing device, the difference to the joint spatio-temporally predicted block to obtain the block.

2. The method as recited in claim 1, wherein the joint spatio-temporally predicted block comprises a coding mode of an H.264/AVC video coding standard.

3. The method as recited in claim 1, wherein applying the subband decomposition for decomposing at least one of the inter frame prediction or the intra frame prediction includes:

applying a 1-dimensional low-pass filter horizontally and vertically to the block to obtain the low-pass component; and subtracting the low-pass component from the block to obtain the high-pass component.

4. The method as recited in claim 1, wherein applying the subband decomposition for decomposing at least one of the inter frame prediction or the intra frame prediction includes:

applying a 2-dimensional low-pass filter to the block to obtain the low-pass component; and subtracting the low-pass component from the block to obtain the high-pass component.

5. A system, comprising:

one or more hardware processors of a computing device configured to receive a bitstream representing a video sequence, the bitstream including a motion vector, a direction vector, and a difference that is to be added to a joint spatio-temporally predicted block to obtain a block of a frame in the video sequence; and a decoder, implemented by the one or more hardware processors, to determine, at least partly in response to receiving the bitstream, the joint spatio-temporally predicted block, the decoder configured to:

determine an inter frame prediction of the block based at least in part on the motion vector;

decompose, applying a subband decomposition, the inter frame prediction into a high-pass component and a low-pass component;

determine an intra frame prediction of the block based at least in part on the direction vector;

decompose, applying a subband decomposition, the intra frame prediction into a high-pass component and a low-pass component; and combine the low-pass component of the intra frame prediction with the high-pass component of the inter frame prediction to obtain the joint spatio-temporally predicted block; and wherein the one or more hardware processors of the computing device are further configured to add the difference to the joint spatio-temporally predicted block to obtain the block.

6. The system as recited in claim 5, wherein the joint spatio-temporally predicted block comprises a coding mode of an H.264/AVC video coding standard.

7. The system as recited in claim 5, further comprising a subband decomposition engine that includes a low-pass filter selected from the group of filters consisting of:
- a 1-dimensional low-pass filter configured to be applied horizontally and vertically to the block to obtain the low-pass component of at least one of the inter frame prediction or the intra frame prediction; and
- a 2-dimensional low-pass filter configured to be applied to the block to obtain the low-pass component of at least one of the inter frame prediction or the intra frame prediction,
- wherein the subband decomposition engine subtracts the low-pass component from the block to obtain the high-pass component.

* * * * *